(12) United States Patent
Daines et al.

(10) Patent No.: US 6,470,021 B1
(45) Date of Patent: Oct. 22, 2002

(54) COMPUTER NETWORK SWITCH WITH PARALLEL ACCESS SHARED MEMORY ARCHITECTURE

(75) Inventors: Bernard N. Daines; Greg W. Davis, both of Spokane, WA (US); Thomas J. Hammond, Somerville, MA (US); David K. Couch, Spokane; Christopher A. Schalick, Veradale, both of WA (US)

(73) Assignee: Alcatel Internetworking (PE), Inc., Spokane, WA (US)

( * ) Notice: Subject to any disclaimer, the term of this patent is extended or adjusted under 35 U.S.C. 154(b) by 0 days.

(21) Appl. No.: 09/172,101

(22) Filed: Oct. 5, 1998

Related U.S. Application Data (60) Provisional application No. 60/072,699, filed on Jan. 27, 1998.

(51) Int. Cl.$^7$ ............................................. H04L 12/56
(52) U.S. Cl. ................................................... 370/422
(58) Field of Search ................................ 370/360, 398, 370/389, 439, 386, 359, 371, 363, 422, 428, 429

(56) References Cited

U.S. PATENT DOCUMENTS

| | | | | |
|---|---|---|---|---|
| 5,459,720 A | * | 10/1995 | Iliev et al. | 370/60 |
| 6,067,296 A | * | 5/2000 | Heering et al. | 370/363 |
| 6,088,361 A | * | 7/2000 | Hughes et al. | 370/439 |
| 6,108,334 A | * | 8/2000 | Blanc et al. | 370/389 |
| 6,125,111 A | * | 9/2000 | Snow et al. | 370/360 |
| 6,259,699 B1 | * | 7/2001 | Opalka et al. | 370/398 |

OTHER PUBLICATIONS

"Switching Basics," *High–Speed Networking with LAN Switches*, by Gilbert Held, chapter 2, pp. 33–61 (1997).
"Frame Switching, Routing, and Protocols," *Fast Ethernet*, by Liam B. Quinn and Richard G. Russell, chapter 7, pp. 109–147 (1997).
"Switched Ethernet and Fast Ethernet Standards," *Switched and Fast Ethernet: How It Works and How to Use It*, by Robert Breyer and Sean Riley, chapter 3, pp. 41–78. (1995).

* cited by examiner

*Primary Examiner*—Hassan Kizou
*Assistant Examiner*—Lu Yin
(74) *Attorney, Agent, or Firm*—Christie, Parker & Hale, LLP

(57) ABSTRACT

A packet switch includes a multiple of bidirectional ports that are each connected by dedicated signal paths to a multiple of memory subsystems that in turn are connected to shared memory within the switch. The signal path from each port carries a fragment of a data stream between the port and each memory subsystem. The ports send and receive data stream fragments in parallel from the memory subsystems. This parallel action reduces the bandwidth required of a memory subsystem by dividing the port's data stream among the multiple memory subsystems. In storing data for forwarding to another port, each memory subsystem selects on a time division basis in parallel the data stream fragments from the same port and stores them in memory. In retrieving data from memory for a port, each memory subsystem selects on a time division basis in parallel the same port to receive the data stream fragments read from memory. The bit width of the signal paths between the ports and memory subsystems is reduced by sending smaller, individual data stream fragments between ports and memory subsystems and sending larger, aggregate data stream fragments between memory subsystems and memory. Within each memory subsystem are modules that combine individual data stream fragments into aggregate data stream fragments for storage in memory and modules that split aggregate data stream fragments read from memory into individual data stream fragments for transmission to ports.

20 Claims, 7 Drawing Sheets

COMPUTER NETWORK SWITCH WITH PARALLEL ACCESS SHARED MEMORY ARCHITECTURE

CROSS-REFERENCE TO RELATED APPLICATION

This application is based upon U.S. Provisional Patent Application Ser. No. 60/072,699, filed Jan. 27, 1998.

TECHNICAL FIELD

This invention relates generally to network switching devices. More particularly, this invention relates to switching architecture for computer network switches such as LAN (local area network) switches.

BACKGROUND OF THE INVENTION

A local area network (LAN) is a system for directly connecting multiple computers so that they can directly exchange information with each other. LANs are considered local because they are designed to connect computers over a small area, such as an office, a building, or a small campus. LANs are considered systems because they are made up of several components, such as cables, repeaters, switches, routers, network interfaces, nodes (computers), and communication protocols. Ethernet is one such protocol. Information is communicated through a LAN in frames transported within data packets. ("Frame" and "data packet," while technically different, are often used interchangeably to describe data carrying the information.)

A LAN switch (or, more generally, a packet switch) is generally defined as a multi-port device that transfers data between its different ports based on the destination addresses and/or other information found in the individual packets it receives. Switches can be used to segment LANs, connect different LANs, or extend the collision diameter of LANs. Switches are of particular importance to Ethernet-based LANs because of their ability to increase network diameter. Additional background information on packet switches can be found in a number of references such as *Fast Ethernet* (1997) by L. Quinn et al., *Computer Networks* (3rd Ed. 1996) by A.Tannenbaum, and *High-Speed Networking with LAN Switches* (1997) by G. Held, all of which are incorporated herein by reference.

There are three common switching architectures used in packet switches for forwarding frames from one port to another: crosspoint (also known as crossbar) matrix, shared bus, and shared memory. A crossbar matrix essentially creates a very transient "circuit" between ports for the duration of a frame (or subset of a frame) exchange. There is an electronic switch located at each crossbar in the matrix between every matrix input and output. A switch controller establishes a direct connection within the switch between two ports, based on the destination address and/or other information within a data packet acquired by the packet's entry port. The packet is then forwarded directly from the entry port (also referred to as the sending port) to an exit port (also referred to as a destination port). Latency through the switch is minimal since the entire frame carrying the packet need not be stored within the switch in the process of forwarding the packet. A drawback of the crossbar matrix architecture, however, is the head-of-line blocking that occurs when more than one entry port attempts to send data to the same exit port. The entry port at the head of the line has sole access to the exit port, and data transmission is delayed at the second entry port. This transmission delay can cause the input buffers of the second port to fill and possibly overflow, requiring data packets to be retransmitted to the entry port a number of times before they can be accepted.

A shared-bus architecture uses a common bus as the exchange mechanism for data packets between ports. Each port (or small group of ports) has its own memory, both for input and output queues, depending on the design. Like the crossbar matrix, the shared bus architecture is subject to blocking at busy ports.

A shared memory architecture uses a single common memory as the exchange mechanism for frames between ports. All ports access the shared memory via a shared memory bus. An arbitration mechanism, such as time division multiplexing, controls port access to the memory assuring each entry port a chance to store data that it receives within memory where the exit port can then access it. A problem with present shared memory architectures, however, is that they are not fast enough to transfer multiple gigabits of data per second from one port to another without blocking port access to memory. Such transfer rates are required for newer, full duplex gigabit packet switches for use in LANs, wide area networks (WANs).

A multi-gigabit packet switch that uses a conventional shared memory architecture might theoretically be achieved by making the shared memory very wide (in terms of bit width) to reduce the number of memory accesses. Wide memory, however, is physically large and often located on multiple printed circuit boards, and thus is difficult to communicate with it since signals must travel long distances to reach all of the pins.

Furthermore, all ports of a switch with a shared memory architecture must have access to the shared memory. Traditionally this access is provided by a time division multiplexing (TDM) memory bus that allocates times when each port controls the bus. This shared bus creates connectivity and signal integrity problems. Wiring a wide bus together across multiple printed circuit boards requires large and expensive connectors and printed circuit cards. And the multiple ports directly connected to the bus cause electrical noise that reduces the maximum frequency the bus can run—effectively limiting the number of ports the switch can support.

An objective of this invention, therefore, is to provide an improved shared memory architecture for a switching device that allows for all ports to gain access to the shared memory at a bandwidth of a gigabit or greater, without being blocked or suffering the other problems noted above.

SUMMARY OF THE INVENTION

A switching device in accordance with the invention includes ports, shared memory, and memory subsystems for routing data between the ports and the shared memory. In one aspect of the invention, each port has its own signal paths that may carry fragments of a data stream between the port and each memory subsystem. The aggregate memory system access is thus very wide (the number of ports times the size of the busses to/from memory for each port), but each port's access is relatively small.

Each port's access to individual memory subsystems is smaller still—only a fragment of the port's data stream is sent to each subsystem. This splitting of the data stream among multiple memory subsystems reduces the bandwidth required for each port through a given memory subsystem. For example, if there are four memory subsystems, a port's memory access bus is fragmented into four pieces, with only ¼ of the port's bandwidth sent through each memory subsystem.

In another aspect of the invention, each memory subsystem may include storage for each port for storing data stream fragments received from the port and a time division multiplexer for selecting among the stored data stream fragments from the ports. The multiplexer is part of a shared TDM bus within the memory subsystem, which avoids the electrical noise problems of running the shared bus directly from memory to each port. The TDM bus of each memory subsystem need support only some fraction of a port's bandwidth times the number of ports. Unlike the prior approach of a single, wide TDM bus directly connecting the ports to shared memory, the invention scales well for high port-count gigabit switches. Each additional port adds only a fraction of a gigabit bandwidth burden on each memory subsystem.

In yet another aspect of the invention, the memory may store data stream fragments selected by the memory subsystems. In storing data stream fragments in memory, the memory subsystems each select in parallel the stored data stream fragment from the same port. For example, all memory subsystems may be storing data stream fragments from ports 0 through 10. To store data from port 0, all memory subsystems select their data stream fragment from port 0. Similarly, in retrieving data from memory, the memory subsystems each select in parallel the same port to receive data stream fragments being read from memory.

These and other aspects, features, and advantages of the invention are described in illustrative embodiments below in conjunction with the following drawings.

DETAILED DESCRIPTION OF ILLUSTRATIVE EMBODIMENTS

Figure 1:
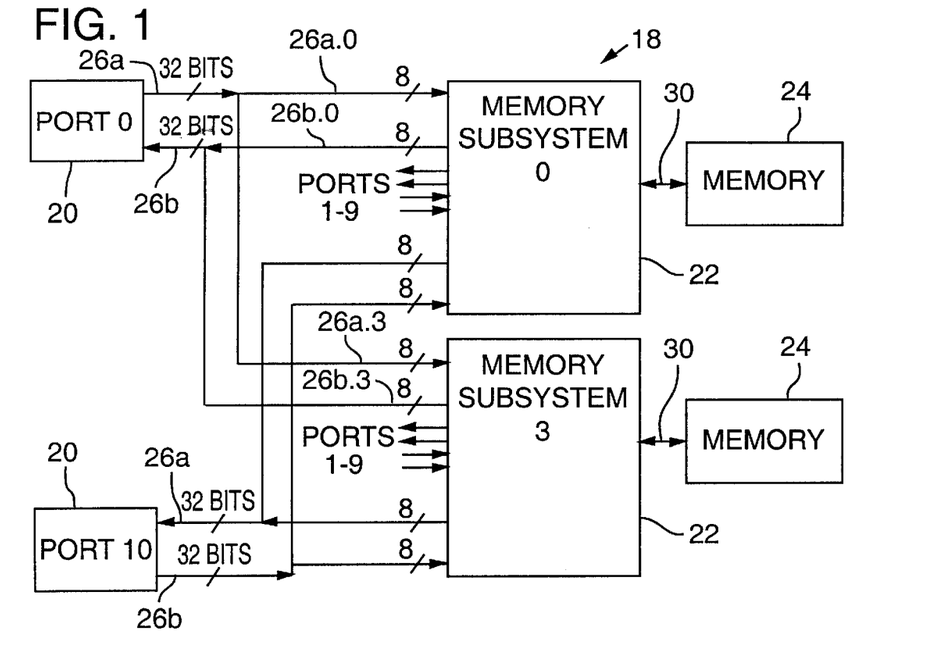
FIG. 1 is a block diagram of a first embodiment of a switching device in accordance with the invention.

FIG. 1 is a block diagram of a first embodiment of a switching device portion 18 in accordance with the invention. The switching device includes a number of bidirectional ports 20 (numbered individually as ports 0 through 10) through which data packets are passed. For purposes of this description, a port that acquires a data packet from an external entity such as a network node, for example, and forwards the packet internally to another port is referred to as an entry or sending port. A port that receives a data packet internally and transmits the data packet to an external entity is referred to as an exit or destination port.

Also within the portion 18 are four memory subsystems 22 (numbered individually as memory subsystems 0–3) and associated random access memory 24. Other portions of the switching device are not shown and are not described because they are not germane to the invention.

Each port 20 has its own separate, dedicated signal paths that include two unidirectional data busses 26*a*, 26*b* for establishing a data stream within the switch. Bus 26*a* carries input data from the port to the memory subsystems and bus 26*b* carries output data from the memory subsystems to a port. Each bus splits into four 8-bit signal paths, one path of which is connected to each memory subsystem. In the switch embodiment of FIG. 1, for example, the bus 26*a* splits into paths 26*a*.0–26*a*.3, with the first and last paths 26*a*.0 and 26*a*.3 shown connected to the first and last memory subsystems 0 and 3. Similarly, the bus 26*b* splits into paths 26*b*.0–26*b*.3, with the first and last paths 26*b*.0 and 26*b*.3 shown connected to the first and last memory subsystems 0 and 3. These signal paths each carry a fragment of the data stream from port 0 to a memory subsystem and a fragment of the data stream from a memory subsystem to port 0. Other signal paths connect the other ports to the memory subsystems 22 in the same manner. A port 20 sends its data stream fragments in parallel through each path of its bus 26*a*. As will be described, a port also receives data stream fragments in parallel from each path of its bus 26*b*.

Each memory subsystem 22, in turn, is connected to a separate memory 24 by a memory bus 30. As will be described, separate memories are used in this embodiment of the invention to reduce the width of the bus. Within each memory, moreover, several separate memories may be used to further reduce the bit width required of each memory. For example, a memory 24 may comprise four memories each being 36 bits wide. By wiring the bus 30 from a memory subsystem to address the same memory locations in each separate memory, a data bus of 144 bits can be constructed between each memory subsystem and memory.

Figure 2:
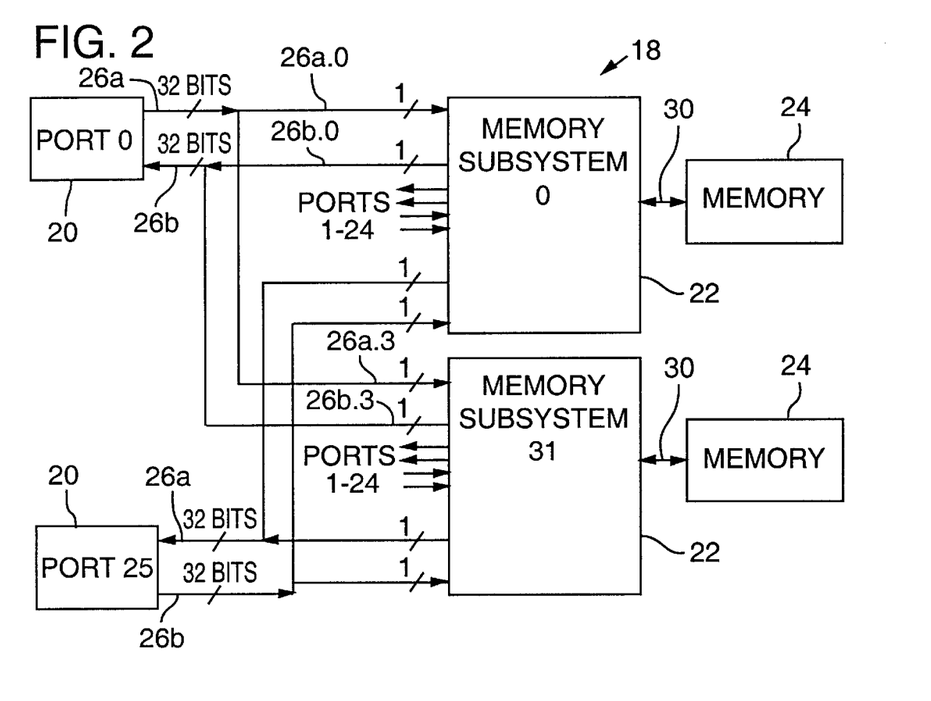
FIG. 2 is a block diagram of a second embodiment of a switching device in accordance with the invention.
Figure 3:
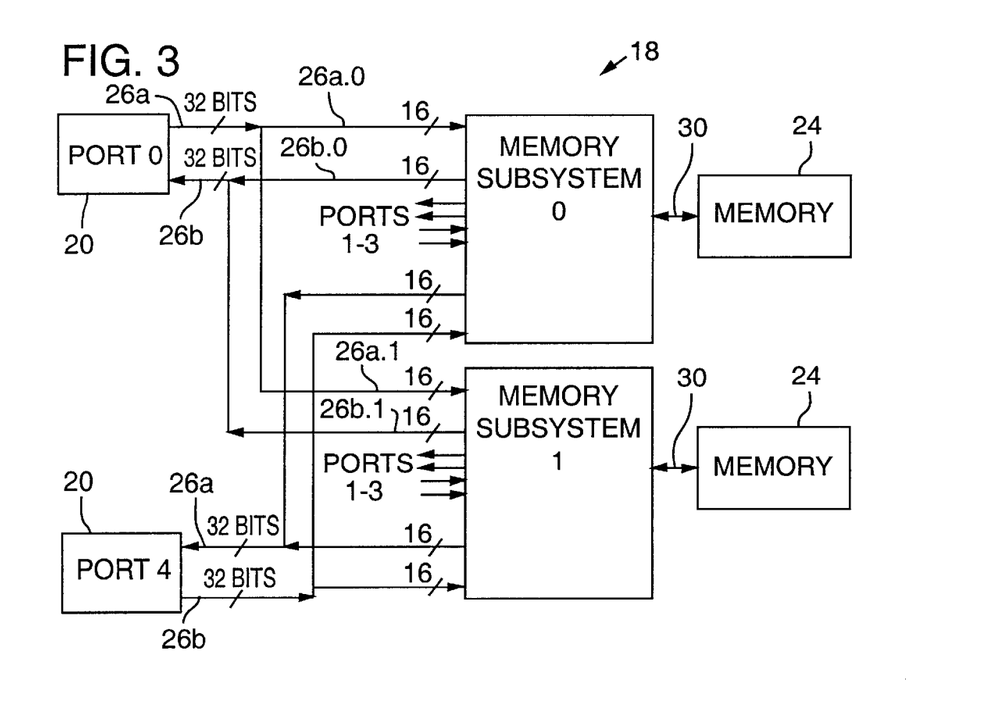
FIG. 3 is a block diagram of a third embodiment of a switching device in accordance with the invention.

The embodiment of FIG. 1 is only one of many possible with the invention. FIGS. 2 and 3 illustrate two others. In FIG. 2, each port is connected via a signal path to 32 memory subsystems 0–31. Each bus 26*a* and 26*b* splits into 32 one-bit paths, one path of which is connected to each memory subsystem. In the switch embodiment of FIG. 2, the bus 26*a* splits into paths 26*a*.0–26*a*.31, with the first and last paths 26*a*.0 and 26*a*.31 shown connected to the first and last memory subsystems 0 and 31. Similarly, the bus 26*b* splits into paths 26*b*.0–26*b*.31 with the first and last paths 26*b*.0 and 26*b*.31 shown connected to the first and last memory subsystems 0 and 31. These paths each carry a one-bit fragment of the data stream from port 0 to each memory subsystem 22 and a one-bit fragment of the data stream from each memory subsystem to port 0. Other signal paths connect the other ports to the memory subsystems 22 in the same manner. In FIG. 3, each port is connected via a signal path to two memory subsystems 0–1. Each bus 26*a* and 26*b* splits into two 16-bit paths, one path of which is connected to each memory subsystem. The bus 26*a* splits into paths 26*a*.0 and 26*a*.1 that are connected, respectively, to the memory subsystems 0 and 1. Similarly, the bus 26*b* splits into paths 26*b*.0 and 26*b*.1 that are connected, respectively, to the memory subsystems 0 and 1. These signal paths each carry a 16-bit fragment of the data stream from port 0 to each memory subsystem 22 and a 16-bit fragment of the data stream from each memory subsystem to port 0. Other signal paths connect the other ports to the memory subsystems 22 in the same manner.

The design tradeoff in the embodiments of FIGS. 1 through 3 is complexity for bandwidth. An embodiment such as that in FIG. 3 is less complex because it has fewer memory subsystems, but a switching device that includes the FIG. 3 embodiment supports fewer ports.

Figure 4:
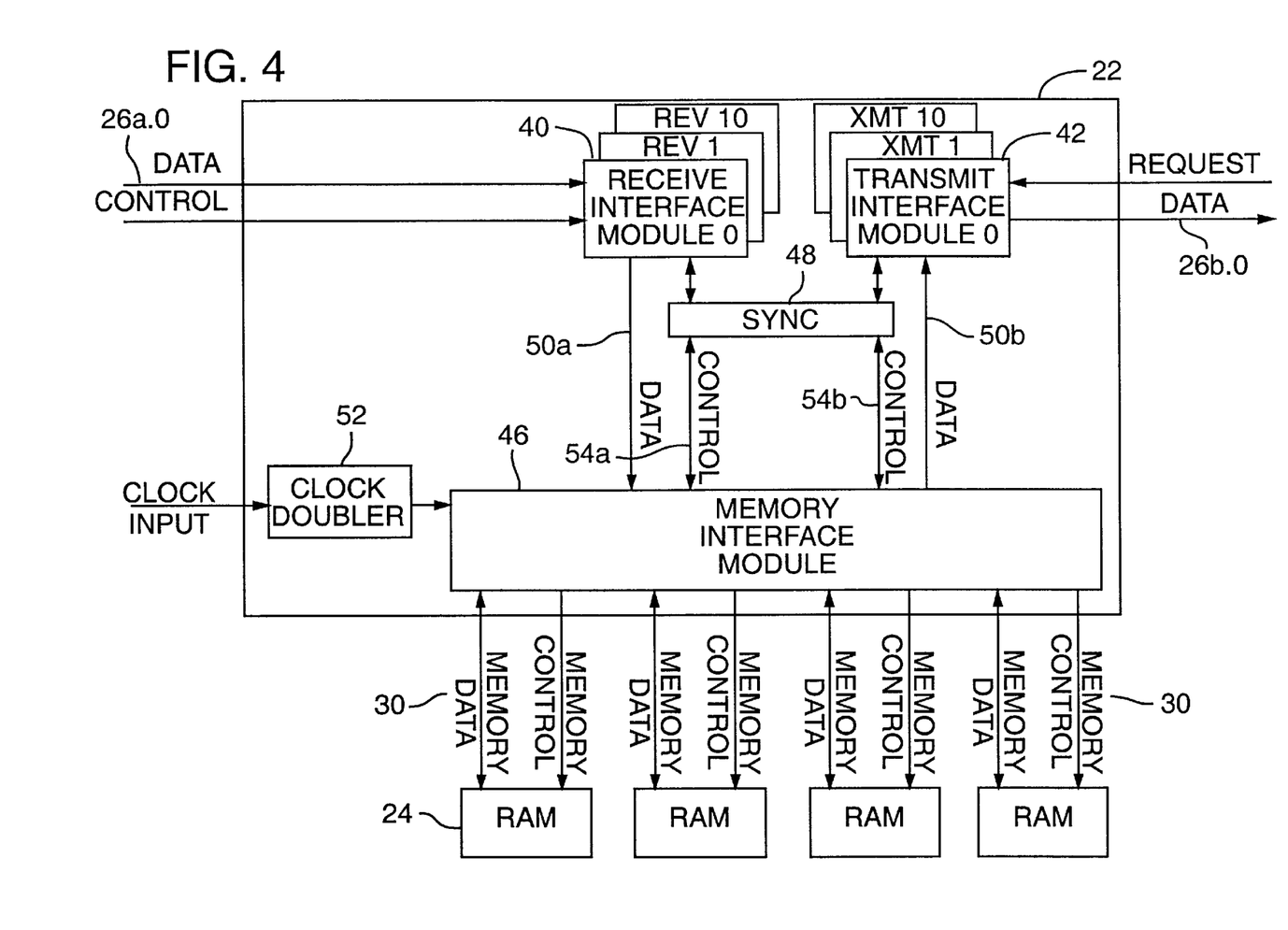
FIG. 4 is a block diagram of a memory subsystem within the switching device of FIG. 1 showing receive and transmit modules and a memory interface module (MIM).

FIG. 4 is a block diagram of a memory subsystem 22 within the switching device. The memory subsystem includes multiple receive modules 40 (numbered individually 0 through 10) and transmit modules 42 (numbered individually 0 through 10), a pair for each port. The subsystem also includes a MIM (MIM) 46 and a sync module 48. Each port 20 is connected to a receive module via its signal path (bus 26a and control lines). Similarly, each port is connected to a transmit module via its signal path (bus 26b and control lines). In operation, a receive module combines successive data stream fragments it receives from a port (such as seventeen 8-bit fragments in this embodiment) into aggregate data stream fragments. The aggregate data stream fragments are then presented to the MIM 46 for selection on a time division basis via an internal TDM data bus 50a.

The clock rate of the MIM 46, however, is double that of the receive and transmit modules. This higher clock rate enables the MIM to read and write data to memory at a faster rate than which the receive and transmit modules communicate data to the port, thereby eliminating blocking. This doubling is provided by a clock doubler 52. The sync module 48 provides synchronism between the receive modules 40 and MIM 46 by changing the frequency of a control signal 54a associated with data bus 50a. Similarly, the sync module 48 provides synchronism between the transmit modules 42 and MIM 46 by changing the frequency of a control signal 54b associated with another TDM data bus 50b.

FIG. 4 shows in particular the connection of port 0 to its receive module 40 and its receive module to MIM 46, but the same signal paths also exist for the other 10 ports of this embodiment. Data fragments are continually sent by each port independently of other ports to the port's associated receive module and stored therein for selection by the MIM 46. Furthermore, as noted above, each port sends in parallel its data stream fragments through its bus 26a to the multiple connected memory subsystems. Consequently, the receive module 40 in each memory subsystem for a particular port has at some point in time an aggregate data stream fragment ready for selection by the MIM 46. The MIMs in each of the memory subsystems then select in parallel the aggregate data stream fragments from the same port. Returning to FIG. 1, for example, each of the memory subsystems 0–3 simultaneously selects the stored data stream fragments from its receive module 40 for port 0 and stores them in associated memory 24.

As described, the MIM 46 selects among the stored data stream fragments in the receive modules 40 on a time division basis. That is, module 46 selects, for example, the stored aggregate data stream fragment from the receive module for port 0, then from the receive module from port 1, and so forth through all the ports before it again selects from port 0. If a receive module does not have a suitable data stream fragment at the time set for its selection, the receive module informs the MIM of this fact by not requesting that its data be written to memory.

FIG. 4 also shows a particular connection scheme for connecting each memory subsystem 22 to its associated memory 24. The memory bus 30 from the MIM is wide enough to carry the aggregate data stream fragment plus control signals. In the embodiment of FIG. 1, the bus is 141 bits wide (seventeen 8-bit fragments (136 bits) plus five control signals). The bus is split among four 36-bit wide SRAM chips and wired to store the 136 bits of data in the chips at the same memory address. An address bus also is present but not shown. Its size depends upon the size of memory chips. Of course, the connection scheme is highly dependent upon the physical nature of memory 24. Fewer chips are required if they have a wider bit width.

The relationship between the MIM 46 and the transmit module 42 is similar to that of the receive module, but is designed for the purpose of transmitting data from memory 24 to a port 20. On a time division basis, MIM 46 selects which port is to receive data from memory 24. In making the selection, the module 46 checks each transmit module for a request signal. If a read request signal is present at the transmit module 42, the module 46 reads the requested data from memory and transfers it to the transmit module. If no read request signal is present, the module 46 proceeds to the next transmit module and checks its request signal, and so forth through all of the transmit modules.

The transmit module 42, in response to its read request, receives an aggregate data stream fragment from the MIM 46. The transmit module then divides this aggregate fragment into its constituent successive data stream fragments for transmission to the associated port. In the embodiment of FIG. 1, for example, the aggregate data stream fragment is 17 bytes wide and is divided by the transmit module 42 for port 0 into 17 individual data stream fragments. These individual fragments are then transmitted on successive clock cycles onto bus 26b.0 to port 0.

FIG. 4 shows in particular the connection of port 0 to its transmit module 40 and its transmit module to MIM 46, but the same signal paths also exist for the other 10 ports of this embodiment. Data fragments are continually being sent by each transmit module to its associated port independent of activity by other transmit modules (i.e., a non-blocking behavior). Furthermore, the transmit module in each memory subsystem receives an aggregate data stream fragment from the MIM 46 in parallel and sends in parallel its data stream fragments to the same port.

Figure 5:
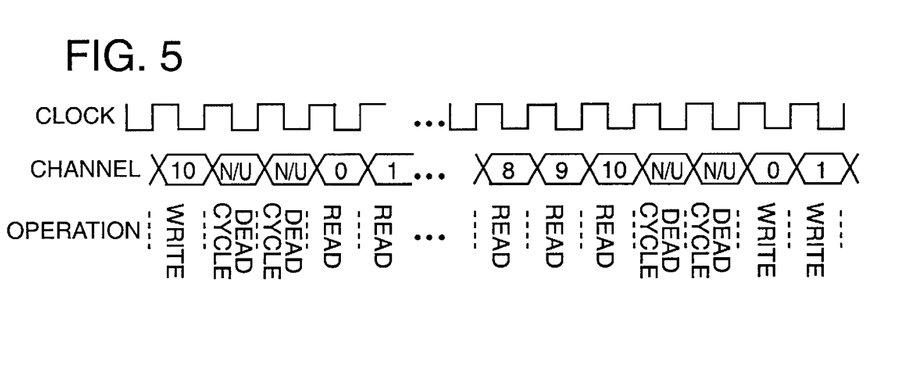
FIG. 5 is a timing diagram of an active channel signal used by the MIM of FIG. 4.

FIG. 5 is a timing diagram of an active channel signal generated by the MIM 46 to select from receive and transmit modules on a time division basis. The active channel signal period for the FIG. 1 embodiment is 26 clock cycles. The signal first provides 11 clock cycles to select in order the 11 receive modules for possible write operations to memory. The write operations are followed by two dead cycles (not used) for turning the memory bus 30 from write to read status. The active channel signal then provides 11 clock cycles to select the 11 transmit modules in order for possible read operations to memory. The read operations are then followed by two more dead cycles (not used) for returning the bus 30 from read to write status.

Figure 6:
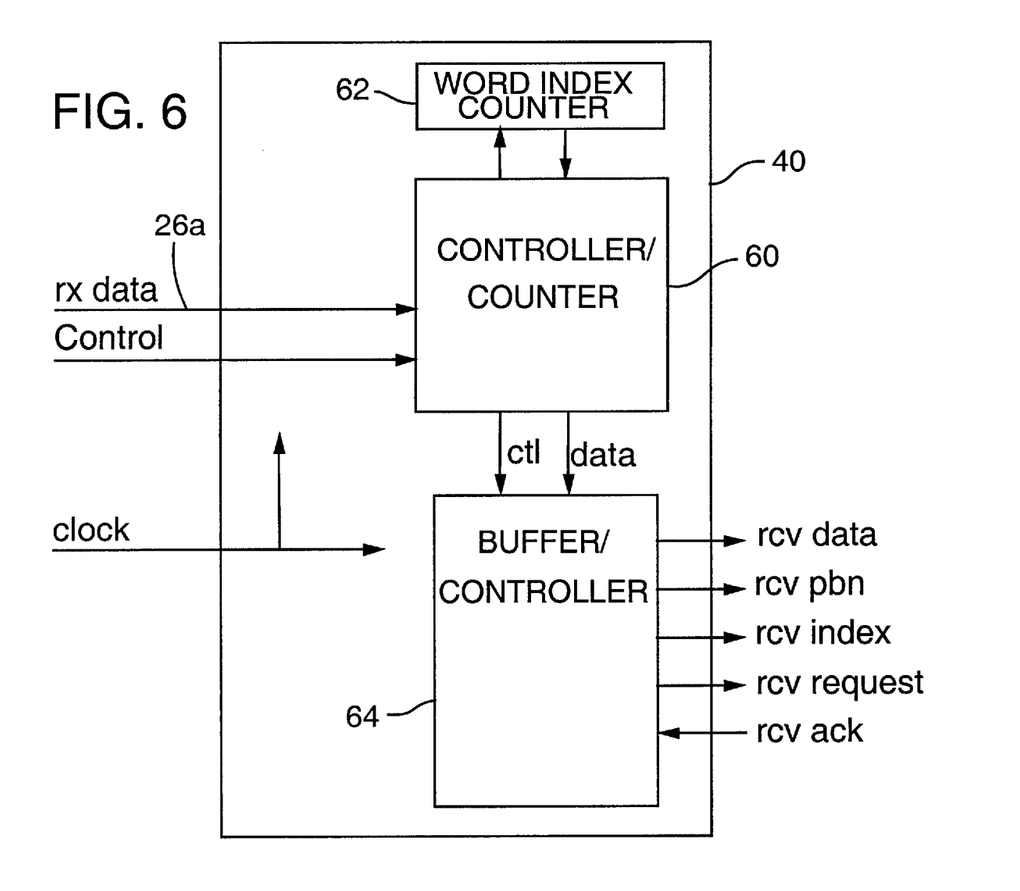
FIG. 6 is a block diagram of the receive module of FIG. 4.

FIG. 6 is a block diagram of the receive module 40 of FIG. 4. The module includes a controller/counter 60, a word index counter 62, and a buffer/controller 64. Bus 26a and a control line connect to controller/counter 60 to provide a stream of data from a port and a control signal. The control signal includes a stream of data bits indicating a packet buffer number (PBN) that provide a memory address for storing the data in memory 24. The signal is received by the counter portion of the controller/counter 60, which counts the bits to ensure that a valid PBN has been received. The controller portion of the controller/counter 60 includes a shift register that accepts data a word at a time (a word is a byte in length in the FIG. 1 embodiment) from bus 26a and assembles the words into a larger word (an aggregate data stream fragment) such as a 17-byte word. The word index counter 62 counts the words as they are received. Once a given number of words are stored or the end of the data packet is detected, the controller/counter 60 transfers the larger word and PBN to the buffer/controller 64, assuming that a valid PBN has been received with the data.

The buffer/controller 64 stores several of the larger words received from the controller/counter 60 and present them in FIFO order to the MIM 46. It also handles signaling between the receive module 40 and MIM 46. These signals include the data (rcv data), the PBN (rcv pbn), an index number associated with the PBN (rcv index), and a write request (rcv request). The buffer/controller 64 also is constructed to receive an acknowledgment from the MIM that the data is being written to memory (rcv ack).

Figure 7:
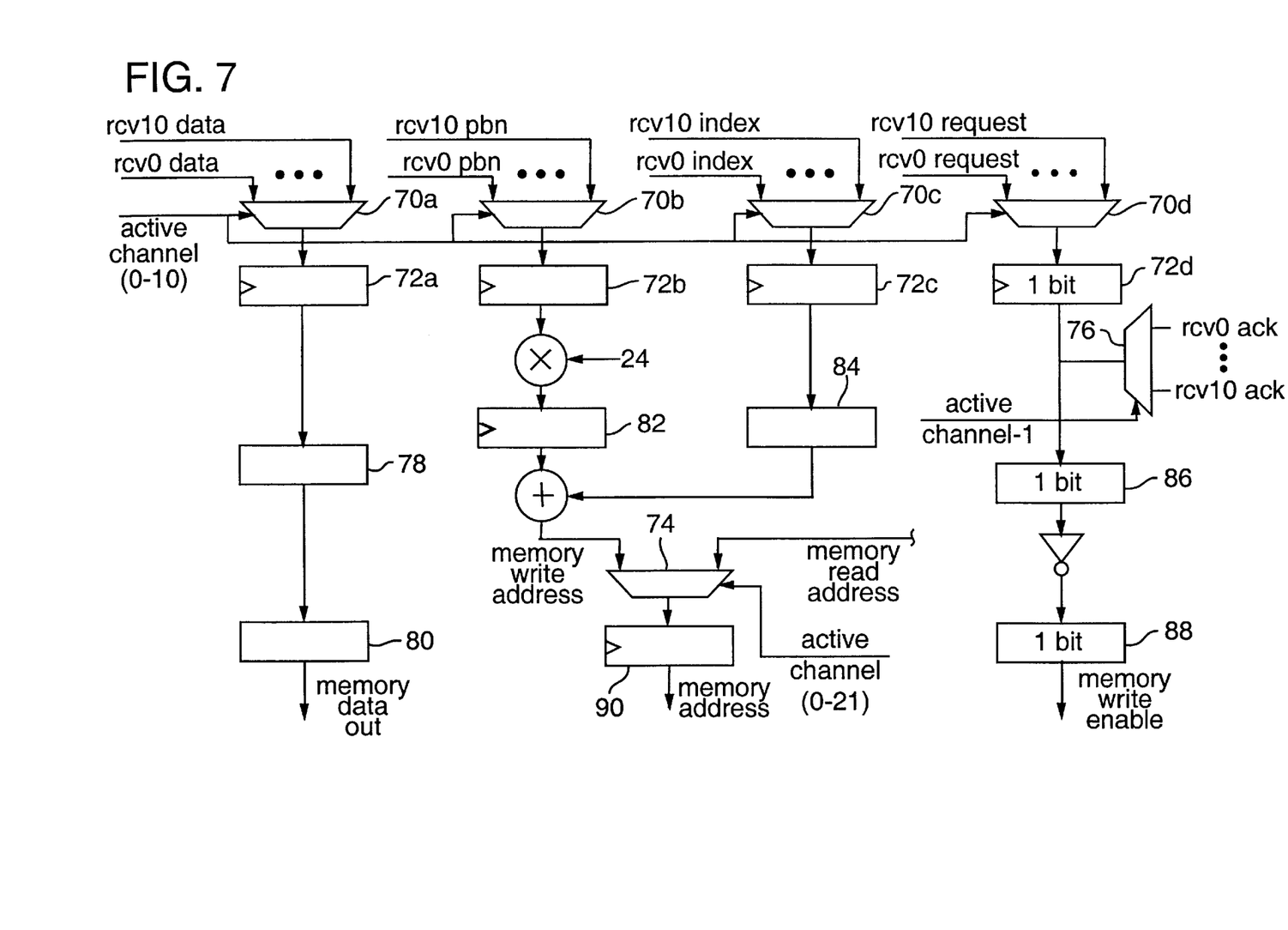
FIG. 7 is a block diagram of the portion of the MIM of FIG. 4 that communicates with the receive module.

FIG. 7 is a block diagram of the portion of the MIM 46 that communicates with the receive module 40. Four multiplexers 70a–70d whose select lines are connected to the active channel signal each receive one of the four signals from the buffer/controller 64. When the active channel signal is a write operation, one of the sets of signals from the multiple receive modules is selected. During the other cycles of the active channel period, the select lines are disabled. In the embodiment of FIG. 1, multiplexer 70a selects among the data presented by the 11 receive modules 40 (rcv0 data to rcv10 data), selecting them in numerical order. Multiplexers 70b, 70c, and 70d similarly select among the PBN, index and write request present by the receive modules. For example, when the active channel signal selects at multiplexers 70a–70d the receive module for port 0, then signals rcv0 data, rcv0 pbn, rcv0 index, and rcv0 request pass through the multiplexers. The selected receive module signals are stored initially in storage registers 72a–72d within the MIM 46. The memory write address is then generated by multiplying the rcv pbn signal value by a constant such as 24 and adding to it the rcv index value. Another multiplexer 74, whose select line is also controlled by the active channel signal, then selects as the memory address the memory write address when the active channel signal indicates a write operation and selects the memory read address when the active channel signal indicates a read operation. The acknowledgment signal rcv ack is generated by a demultiplexer 76 whose select line is also controlled by the active channel signal. The rcv ack signal is derived from rcv request and fed back to the receive module. The rcv request signal also becomes the memory write enable signal to memory 24. Thus the output of the MIM to memory 24 is comprised of memory data out (which is the rcv data signal), a memory address (derived from rcv pbn and rcv index), and a memory write enable signal (derived from rcv request). To synchronize the output and buffer it for memory, registers may be added in the paths of these various signals, such as registers 78–90.

Figure 8:
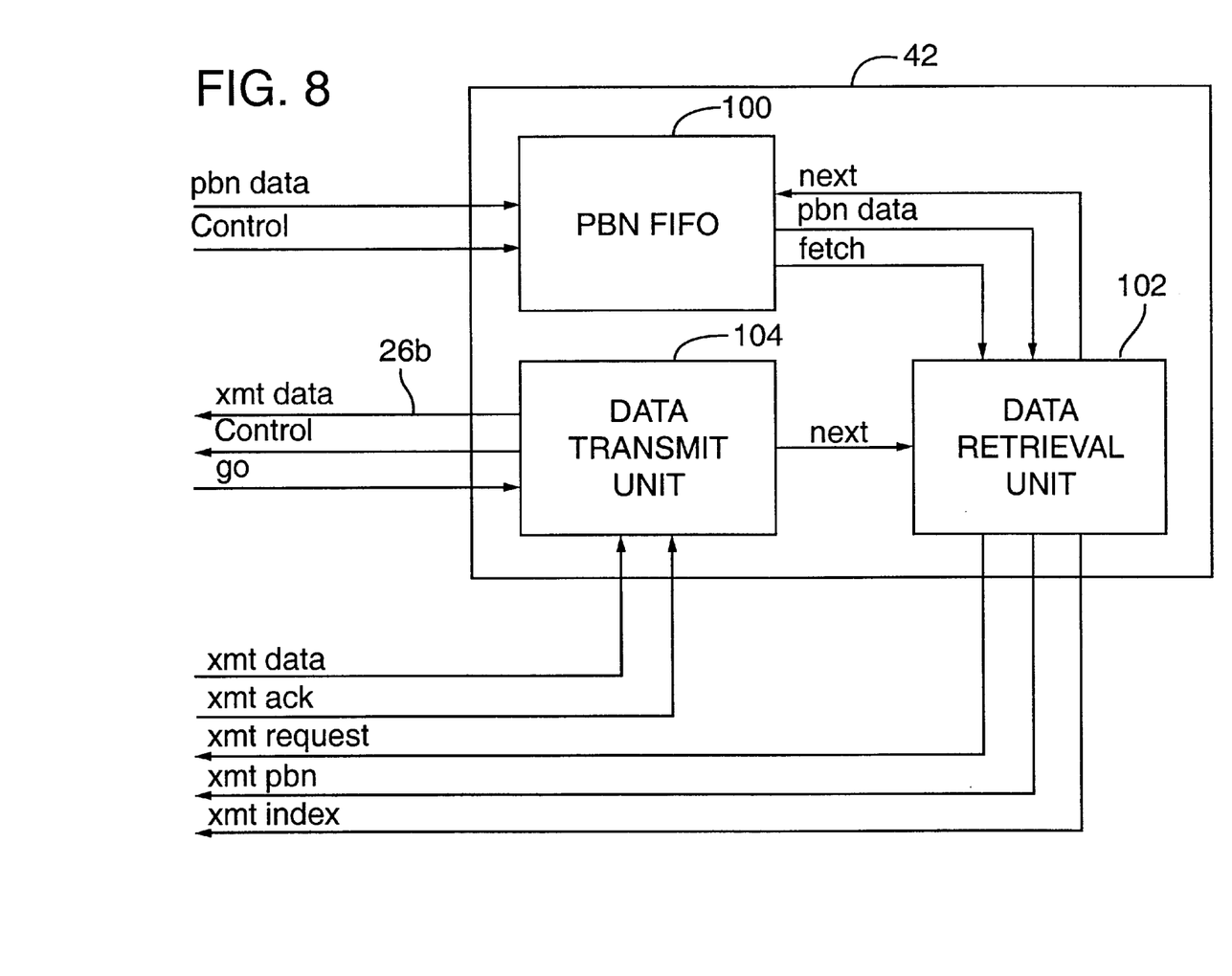
FIG. 8 is a block diagram of the transmit module of FIG. 4.

FIG. 8 is a block diagram of the transmit module 42 of FIG. 4. It includes a PBN FIFO buffer 100, a data transmit unit 104, and a data retrieval unit 102. A request from a port for data stored in memory 24 takes the form of pbn data and a control signal sent to PBN FIFO buffer 100, where it is queued. The buffer then alerts the data retrieval unit with a fetch signal that data is being sought. The data retrieval unit responds with a next signal to request the pbn data. The pbn data is then sent to the data retrieval. The data retrieval unit, in response, generates from the pbn data three signals: xmt request, xmt pbn, and xmt index. These signals are sent to the MIM 46 to request data stored at a specified location in memory.

These signal are presented to the MIM 46, however, only when the data transmit unit 104 indicates to the data retrieval unit 102 via a next signal that the data transmit unit is ready to accept more data from the MIM. The data transmit unit includes a buffer and a shift register, and can store several aggregate data fragments read from memory 24. The data transmit 104 buffers several aggregate data stream fragments received from memory and then transfers then one by one to its shift register. The shift register splits the aggregate data stream fragment into individual fragments and sends them successively out to the requesting port. The next signal indicates to the data retrieval unit when there is room in the data transmit unit's buffer for another aggregate data stream fragment. In the embodiment of FIG. 1, the data transmit unit 104 receives an aggregate data stream fragment of 17-bytes from the MIM, splits it into individual words of one byte, and sends the words one by one over bus 26b to the requesting port. The first word is not sent, however, until a go signal is received by the data transmit unit from the port, indicating that the port is ready for the next packet.

Figure 9:
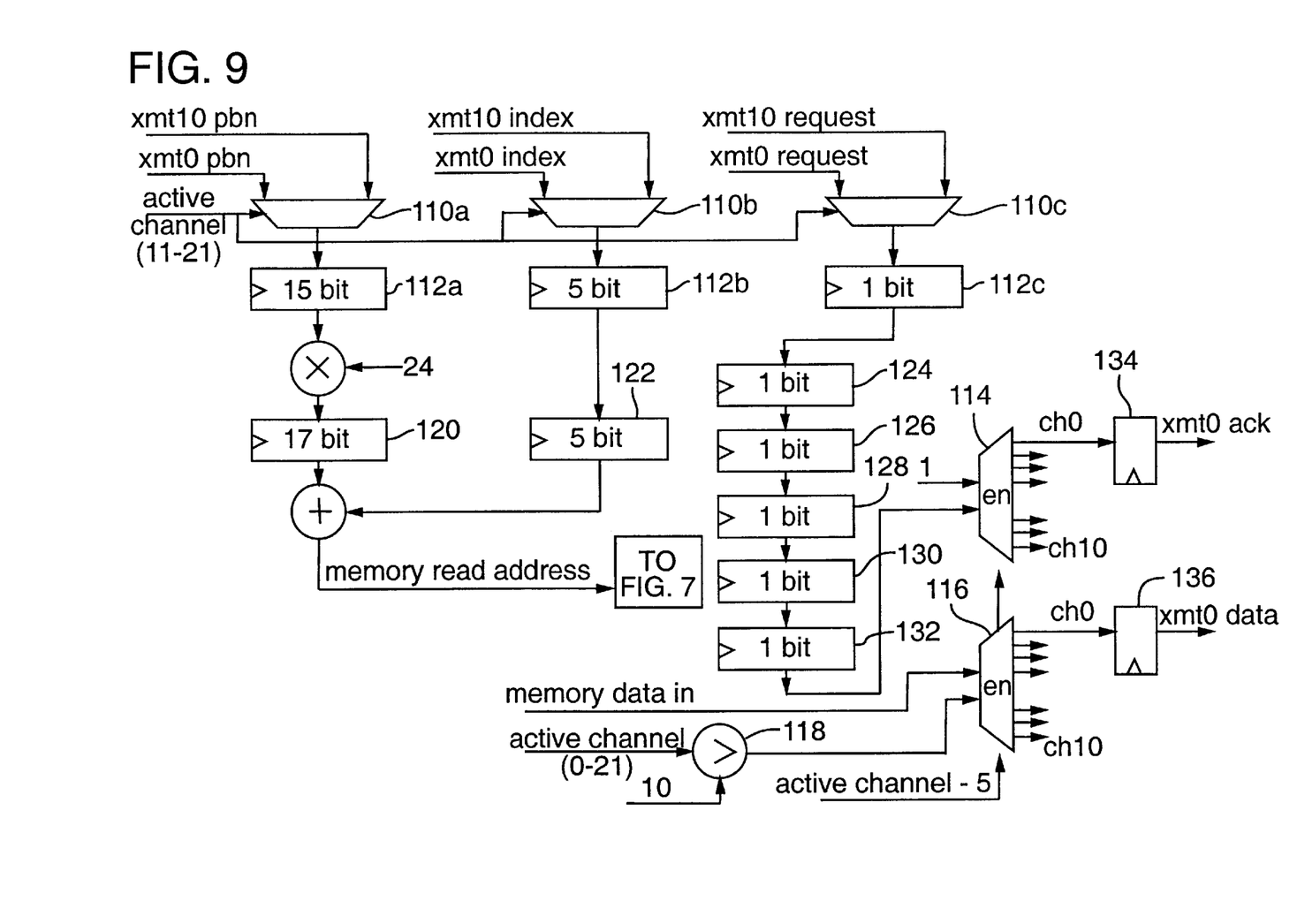
FIG. 9 is a block diagram of the portion of the MIM of FIG. 4 that communicates with the transmit module.

FIG. 9 is a block diagram of the portion of the MIM 46 that communicates with the transmit module 42. Three multiplexers 110a–110c whose select lines are connected to the active channel signal each receive one of the three signals from the data retrieval unit 102. When the active channel signal is a read operation, one of the sets of signals from the transmit modules is selected. During the other cycles of an active channel's period, the select lines are disabled. In the embodiment of FIG. 1, multiplexer 110a selects among the packet buffer numbers presented by the 11 transmit modules 42 (xmt0 pbn to xmt 10 pbn), selecting the packet buffer numbers in numerical order. Multiplexers 110b and 110c similarly select among the index and read request from each transmit module 42. For example, when the active channel signal selects at multiplexers 110a–110c the transmit module for port 0, then signals xmt0 pbn, xmt0 index, and xmt0 request pass through the multiplexers.

The selected signals are stored initially in storage registers 112a–112c within the MIM 46. The memory read address is then generated by multiplying the xmt pbn signal value by a constant such as 24 and adding to it the xmt index value. The memory read address is selected at multiplexer 74 (see FIG. 7) when the active channel signal has a value from 11 to 21. The read request signal xmt request, when present, generates an acknowledgment signal xmt ack through demultiplexer 114 that is fed back to the transmit module 42. The select line of the demultiplexer is controlled by a delayed active channel signal. The retrieved data from memory 24 (memory data in) is also passed through a demultiplexer 116 that is enabled by the output of a comparator 118. The inputs to the comparator are the active channel signal and the number 10. When the active channel signal is greater than (meaning that it is in the read half of its period), then the demultiplexer is enabled and the correct transmit module is selected by the delayed active channel signal to receive the memory data. Thus the output of the MIM to a transmit module 42 is comprised of memory data in (which is the xmt data signal) and an acknowledgment signal (xmt ack, derived from xmt request). To synchronize the output and buffer it for transmission, registers may be added in the paths of these various signals, such as registers 120–136.

Having understood the principles of the invention from the embodiments of the invention shown and described herein, those of skill in the art will recognize that the embodiments can be modified in arrangement and detail without departing from such principles. The construction of the various modules can be varied while still providing the functions described. Elements of the various modules can be implemented in hardware, software, or firmware as desired.

The invention may be used where appropriate in any packet switching device such as a LAN switch, a router, etc.

In view of the many possible embodiments to which the principles of the invention may be applied, it should be understood that these embodiments are illustrative only and should not be taken as a limitation on the scope of the invention. The invention, rather, is defined by the following claims. We therefore claim as the invention all embodiments that may come within the scope of these claims and their equivalents.

We claim:

1. A switching device, comprising:
   a multiple of ports that receive and transmit data packets;
   a multiple of memory subsystems connected by signal paths to each of the multiple of ports, the signal path from each port carrying a fragment of a data stream between the port and a memory subsystem, a memory subsystem including:
      receive storage for each port storing data stream fragments received from the port; and
      a time division multiplexer selecting among the stored data stream fragments from the ports; and
   memory connected to the memory subsystems storing data stream fragments selected by the memory subsystems,
   whereby the memory subsystems each select in parallel the stored data stream fragments from the same port and store them in memory.

2. The switching device of claim 1 wherein the memory subsystem includes:
   a time division demultiplexer selecting which port is to receive a data stream fragment read from memory; and
   transmit storage for each port storing a data stream fragment received from the demultiplexer,
   whereby the memory subsystems select in parallel the same port to receive data stream fragments read from memory.

3. The switching device of claim 2 wherein the transmit storage comprises a shift register storing an aggregate data stream fragment received from the demultiplexer, the aggregate data stream fragment comprised of successive data stream fragments, the shift register dividing the aggregate fragment into its constituent data stream fragments for transmission to the associated port.

4. The switching device of claim 1 wherein the receive storage comprises a shift register storing a multiple of successively-received data stream fragments, the shift register combining the data stream fragments into an aggregate data stream fragment for selection by the time division multiplexer.

5. The switching device of claim 1 including a system clock that sends data stream fragments from a memory subsystem to memory at a faster rate than it sends data stream fragments from a port to the memory subsystem.

6. The switching device of claim 1 wherein the memory comprises separate memories, each memory connected by a separate signal path to a corresponding memory subsystem.

7. A switching device, comprising:
   a multiple of ports that receive and transmit data packets;
   memory storing data stream fragments;
   a multiple of memory subsystems connected by signal paths to each of the multiple of ports and to memory, the signal path from each port carrying a fragment of a data stream between the port and a memory subsystem, a memory subsystem including:
      a time division demultiplexer selecting which port is to receive a data stream fragment read from memory; and
      transmit storage for each port storing a data stream fragment received from the demultiplexer,
   whereby the memory subsystems select in parallel the same port to receive data stream fragments read from memory.

8. A switching device, comprising:
   a multiple of ports that receive and transmit data packets;
   a memory subsystem connected by first signal paths to each of the multiple of ports, the first signal path from each port having a certain bit width and carrying data between the port and the memory subsystem, a memory subsystem including:
      receive storage for each port storing the data received from the port, the receive storage storing a given multiple of successively-received data and combining the data into aggregate data; and
      a time division multiplexer selecting among the stored aggregate data; and
   memory connected by a second signal path to the memory subsystem for storing the selected aggregate data, the second signal path having a bit width greater than the bit width of the first signal path for carrying the aggregate data between the memory subsystem and memory.

9. The switching device of claim 8 wherein the memory subsystem includes:
   a time division demultiplexer selecting among aggregate data stored in memory; and
   transmit storage for each port storing aggregate data selected by the demultiplexer, the transmit storage dividing the aggregate data into its constituent data for transmission to the associated port.

10. A switching device, comprising:
    a multiple of ports that receive and transmit data packets;
    memory;
    a memory subsystem connected by first signal paths to each of the multiple of ports, the first signal path from each port having a certain bit width and carrying data between the port and the memory subsystem, a memory subsystem including:
       a time division demultiplexer selecting among aggregate data stored in memory; and
       transmit storage for each port storing aggregate data selected by the demultiplexer, the transmit storage dividing the aggregate data into its constituent data for transmission to the associated port,
       the memory connected by a second signal path to the memory subsystem for storing the selected aggregate data, the second signal path having a bit width greater than the bit width of the first signal path for carrying the aggregate data between the memory subsystem and memory.

11. In a switching device, a method of communicating data packets from sending ports to destination ports, the method comprising:
    placing a data packet received at a sending port into a data stream;
    splitting the data stream into fragments;
    storing at separate locations each data stream fragment with corresponding data stream fragments from other sending ports;
    selecting in parallel at each storage location on a time division basis the data stream fragments from the same sending port from among the stored data stream fragments; and storing in memory the selected data stream fragments from the same sending port for retrieval by a destination port.

12. The method of claim 11 including:

reading from memory data stream fragments from the same sending port and intended for a destination port;

selecting in parallel at each storage location on a time division basis storage for the destination port from among storage for the multiple ports;

storing in the selected storage at the separate locations the data stream fragments; and sending the data stream fragments from the selected storage at the separate locations to the destination port.

13. The method of claim 11 wherein the storing steps combining successive data stream fragments from the same port stored at a separate location into an aggregate data stream fragment for selection.

14. The method of claim 11 including storing the selected data stream fragments in memory at a faster rate than storing the data stream fragments at separate locations.

15. The method of claim 11 including storing the selected data stream fragments in separate memories.

16. In a switching device, a method of communicating data packets from sending ports to destination ports, the method comprising:

reading from memory data stream fragments from a same sending port and intended for a destination port;

selecting in parallel at separate storage locations on a time division basis storage for the destination port from among storage for the multiple ports;

storing in the selected storage at the separate locations the data stream fragments; and sending the data stream fragments from the selected storage at the separate locations to the destination port.

17. In a switching device, a method of communicating data packets from sending ports to destination ports, the method comprising:

converting a data packet into a data stream comprised of data that is successively sent from the sending port;

storing the successive data;

combining the stored successive data into aggregate data;

selecting on a time division basis among aggregate data from different sending ports; and storing in memory the selected aggregate data for retrieval by a destination port.

18. The method of claim 17 wherein the data that is successively sent from the sending port is split into fragments that are stored at separate locations, and the step of and selecting among aggregate data at the separate locations occurs in parallel.

19. The method of claim 17 wherein the step of storing in memory the selected aggregate data occurs in parallel.

20. In a switching device, a method of communicating data packets from sending ports to destination ports, the method comprising:

reading from memory aggregate data;

selecting on a time division basis storage for the destination port from among storage for the multiple ports;

storing in the selected storage the aggregate data;

dividing the aggregate data into its constituent data for transmission to the destination port;

sending the constituent data successively to the destination port.

* * * * *